(12) United States Patent
Bauer et al.

(10) Patent No.: US 7,860,623 B2
(45) Date of Patent: Dec. 28, 2010

(54) METHOD FOR INCREASING THE DRIVING STABILITY OF A MOTOR VEHICLE

(75) Inventors: Urs Bauer, Frankfurt am Main (DE); Georg Roll, Heusenstamm (DE); Schahrad Schafiyha, Kriftel (DE); Stephan Capellaro, Oberursel-Oberstedten (DE); Michael Gille, Schriesheim (DE); Matthias Muntu, Frankfurt am Main (DE)

(73) Assignee: Continental Teves AG & Co. oHG (DE)

( * ) Notice: Subject to any disclaimer, the term of this patent is extended or adjusted under 35 U.S.C. 154(b) by 787 days.

(21) Appl. No.: 10/592,481

(22) PCT Filed: Mar. 15, 2005

(86) PCT No.: PCT/EP2005/051158

§ 371 (c)(1),
(2), (4) Date: Aug. 30, 2007

(87) PCT Pub. No.: WO2005/087562

PCT Pub. Date: Sep. 22, 2005

(65) Prior Publication Data

US 2008/0147273 A1  Jun. 19, 2008

(30) Foreign Application Priority Data

Mar. 16, 2004  (DE) .................. 10 2004 012 685

(51) Int. Cl.
*B62D 6/00* (2006.01)
*B60T 8/1755* (2006.01)

(52) U.S. Cl. .............. 701/41; 701/73; 701/42; 701/80; 701/71; 303/146; 303/148; 180/197; 280/6.159

(58) Field of Classification Search .................. 701/73; 303/148; 280/5.505, 6.159
See application file for complete search history.

(56) References Cited

U.S. PATENT DOCUMENTS

| | | | | |
|---|---|---|---|---|
| 3,744,587 A | * | 7/1973 | Schimkat et al. ............ | 180/446 |
| 5,035,295 A | * | 7/1991 | Leiber et al. ................ | 180/415 |
| 5,482,133 A | | 1/1996 | Iwata et al. | |
| 6,154,696 A | * | 11/2000 | Nishi et al. ................... | 701/41 |
| 7,302,328 B2 | * | 11/2007 | Kato et al. ................... | 701/41 |
| 7,418,329 B2 | * | 8/2008 | Yasui et al. .................. | 701/41 |

(Continued)

FOREIGN PATENT DOCUMENTS

DE  101 55 938 A1  9/2002

(Continued)

*Primary Examiner*—Thomas G Black
*Assistant Examiner*—Lin B Olsen
(74) *Attorney, Agent, or Firm*—RatnerPrestia (57) ABSTRACT

A process for increasing the stability of a vehicle upon acceleration on a roadway with a non-homogenous coefficient of friction, whereby a drive wheel is acted on by a braking force on a side with a low coefficient of friction by means of a drive slip regulation. A value ($p_{ASR}$) is determined which corresponds to the braking force ($F_{B,ASR}$) set by the drive slip regulation (ASR). The value determined ($p_{ASR}$) is used for the determination of a disrupting yaw momentum ($M_Z$), and a control portion ($\Delta\delta_Z$) of a supplemental steering angle ($\Delta\delta$) is determined in dependence on the disrupting yaw momentum ($M_Z$). An apparatus for the implementation of the process is also provided.

15 Claims, 5 Drawing Sheets

U.S. PATENT DOCUMENTS

| | | | |
|---|---|---|---|
| 2002/0101116 A1* | 8/2002 | Kostadina | 303/146 |
| 2002/0198646 A1* | 12/2002 | Bedner et al. | 701/48 |
| 2003/0216851 A1* | 11/2003 | Trefzer et al. | 701/82 |
| 2006/0069480 A1* | 3/2006 | Hiwatashi | 701/41 |
| 2006/0100766 A1* | 5/2006 | Schwarz et al. | 701/71 |
| 2007/0001510 A1* | 1/2007 | Miller | 303/149 |
| 2007/0188020 A1* | 8/2007 | Schmidt et al. | 303/149 |

FOREIGN PATENT DOCUMENTS

| | | |
|---|---|---|
| EP | 0 992 373 A2 | 4/2000 |
| WO | WO 2004/005093 A1 | 1/2004 |

* cited by examiner

METHOD FOR INCREASING THE DRIVING STABILITY OF A MOTOR VEHICLE

This application is the U.S. national phase application of PCT International Application No. PCT/EP2005/051158, filed Mar. 15, 2005, which claims priority to German Patent Application No. DE 10 2004 012 685.2, filed Mar. 16, 2004.

BACKGROUND OF THE INVENTION

1. Technical Field

The invention relates to a process for increasing the stability of a vehicle upon acceleration on a roadway with a non-homogenous coefficient of friction, whereby a drive wheel is acted on with a braking force on the side with low coefficient of friction by means of acceleration slip regulation.

The invention additionally relates to an apparatus suitable for the implementation of the process.

2. Description of the Related Art

Upon the acceleration of a vehicle, an excess rotation of the drive wheels can occur, particularly on a roadway with a low coefficient of friction, through which the lateral guiding force that can be transmitted by the tires is reduced. The result is a destabilization of the vehicle, which can, in vehicles with rear drive, for example, lead to an oversteering when rounding a curve.

Modern vehicles thus have regulating systems that reduce the slipping of the wheels on excessively rotating drive wheels through engagement of the brakes to the value that is necessary to guarantee traction, so that a greater drive torque is imparted to the wheels, and the lateral guiding force that can be transmitted by the tires is increased. These regulating systems are termed acceleration slip regulation (ASR). In addition, the terms "electronic differential lock (EDS)," "automatic stability control (ASC)," and "traction control system (TCS)" are commonly used.

In a µ-split situation—that is to say, upon the presence of a non-homogenous coefficient of friction of the roadway—the drive wheel is, during an ASR engagement, braked on the side with a low coefficient of friction. Because of the effect of the compensation gear (differential) of the drive axle, the drive force is increased on the side with a high coefficient of friction relative to the drive force on the side with a low coefficient of friction, and a disrupting yaw momentum arises on the vehicle. This can lead to a veering or to an inward turning of the vehicle into the direction of the side with a low coefficient of friction, as the case may be, if a sufficient lateral guiding force for supporting the lateral force brought about by the disrupting yaw momentum cannot be built up on the tires.

SUMMARY OF THE INVENTION

The task that thus forms the basis for the invention is that of better stabilizing the vehicle in an ASR engagement in a µ-split situation.

The process in accordance with the invention for increasing the stability of a vehicle upon acceleration on a roadway with a non-homogenous coefficient of friction, whereby a drive wheel on a side with low coefficient of friction is influenced with a braking force by means of acceleration slip regulation, is characterized in that a value that corresponds to the braking force set by the acceleration slip regulation is determined, that the value determined is used for the determination of a disrupting yaw momentum, and that a control portion of a supplemental steering angle is determined in dependence on the disrupting yaw momentum.

In the process in accordance with the invention, if the acceleration slip regulation is active in an µ-split situation, then a supplemental steering angle with which a yaw momentum can be built up is determined, which compensates for the disrupting yaw momentum that is brought about by the differing drive force on the side with the high and the side with the low coefficient of friction. The supplemental steering angle is thereby determined in dependence on the disrupting yaw momentum, which corresponds to an advance control or to a disturbance value compensation in the sense of control theory, as the case may be.

The turning inward of the vehicle can thereby be counteracted at an early stage by an adjustment of the supplemental steering angle determined, so that the vehicle driver does not need to counter-steer and/or reduce the drive torque, or else no ESP engagement is necessary to stabilize the vehicle, as the case may be. Furthermore, lateral forces acting on the wheels because of the disrupting yaw momentum are broken down, so that the lateral guiding force that is potentially available, and the stability of the driving condition of the vehicle, are thereby increased. The vehicle can thereby be controlled more simply, more securely, and more comfortably in a start-up process on a roadway with a non-homogenous coefficient of friction.

The knowledge that the drive force acting on the side with high coefficient of friction is, during an ASR engagement in a µ-split situation, increased relative to the drive force acting on the side with a low coefficient of friction by an amount that corresponds to the braking force on the wheel braked on the side with a low coefficient of friction, forms the basis for the determination, in accordance with the invention, of the disrupting yaw momentum. This results from the function of the differential of the drive axle, which ensures an equal distribution of the drive torque on the drive wheels. If one drive wheel is thereby braked, then the differential of the portion of the drive torque counteracting the braking torque is transferred to the unbraked wheel, on which this portion then exerts an additional drive force.

In one suitable form of implementation of the invention, it is thereby provided that the braking force on the wheel braked during the ASR engagement is determined from a braking pressure in the wheel brake of the drive wheel on the side with a low coefficient of friction.

In one preferred form of implementation of the invention, it is provided that the supplemental steering angle is set on at least one steerable wheel of the vehicle.

In one additional preferred form of implementation of the invention, it is provided that a supplemental steering momentum is determined in dependence on the supplemental steering angle, and the steering column of the vehicle is influenced by the supplemental steering momentum.

The supplemental steering angle is consequently either set directly by an actuator on the steerable wheel of the vehicle, or else the vehicle driver is thereby supported by a supplemental steering momentum in setting a supplemental steering angle, which preferably results from the sum of the steering angle momentarily commanded by the driver and the supplemental steering angle.

It is preferably provided that the control portion of the supplemental steering angle is computed by means of a control law with the form:

$$\Delta \delta_Z = K_M(v) \cdot \hat{M}_Z$$

whereby $\Delta \delta_Z$ signifies the control portion of the supplemental steering angle, $K_M$ signifies an amplification factor, v signifies the reference speed of the vehicle, and $\hat{M}_Z$ signifies an estimated value for the disrupting yaw momentum.

The amplification factor is, in particular, hereby adjusted to the vehicle reference speed in the sense of an adaptive control.

It is advantageously provided that a regulating portion of the supplemental steering angle is determined in dependence on a standard deviation between a control value measured by means of vehicle sensors or computed from measuring signals and a reference value, and that, the supplemental steering angle corresponds to the sum of the regulating portion and the control portion.

By this means, remaining standard deviations of the vehicle behavior can even be corrected after the advance control by means of the control portion of the supplemental steering angle, so that a permissible reliable stabilization of the vehicle is guaranteed.

In one preferred form of implementation of the invention, it is thereby provided that the regulating portion of the supplemental steering angle is determined in dependence on a deviation in yaw rates between the yaw rate of the vehicle and a reference yaw rate of the vehicle, whereby the reference yaw rate is determined by means of at least one value preset by the vehicle driver, preferably the steering angle commanded by the vehicle driver by means of a vehicle model.

It is thereby preferably provided that the regulation portion of the supplemental steering angle is determined by means of a control law with the form:

$$\Delta\delta_R = K_{FB,P}(v)\cdot\Delta\dot\psi + K_{FB,I}(v)\cdot\Delta\psi + K_{FB,D}(v)\cdot\Delta\ddot\psi$$

whereby $\Delta\delta_R$ signifies the regulation portion of the supplemental steering angle, $K_{FB,P}$, $K_{FB,I}$ and $K_{FB,D}$ each signify an amplification factor, v signifies the reference speed of the vehicle, $\Delta\dot\psi$ signifies the deviation of the yaw rates, $\Delta\psi$ signifies a yaw angle deviation, and $\Delta\ddot\psi$ signifies a yaw acceleration deviation.

This advantageously corresponds to the regulating strategy of a proportional-differential controller, which makes a particularly rapid reaction of the control system to the deviation of the yaw rates possible. Furthermore, an adaptation of the amplification factors to the vehicle speed also advantageously occurs here.

In one additional preferred form of implementation of the invention, it is provided that the regulation portion of the supplemental steering angle is determined in dependence on a side-slip angle deviation between an estimated side-slip angle of the vehicle and a reference side-slip angle, whereby the reference side-slip angle is preset by a threshold value.

In one additional preferred form of implementation of the invention, it is provided that the regulation portion of the supplemental steering angle is determined in dependence on a lateral acceleration deviation between a measured lateral acceleration of the vehicle and a reference lateral acceleration, whereby the reference lateral acceleration is preset by a threshold value.

In one preferred form of implementation of the invention, it is provided that the supplemental steering angle is set by means of a steer-by-wire steering unit.

In one additional preferred form of implementation of the invention, it is provided that the supplemental steering angle is set by means of a superimposition steering.

In addition to the steering movement commanded by the vehicle driver, an additional steering movement is thereby preferably carried out in accordance with the supplemental steering angle.

In one advantageous form of implementation of the invention, it is additionally provided that the supplemental steering momentum is set by means of an electrical or hydraulic servo-steering unit.

In one additional advantageous form of implementation of the invention, it is provided that the supplemental steering momentum is set by means of a steer-by-wire-steering unit.

The apparatus in accordance with the invention for increasing the stability of a vehicle in an acceleration on a roadway with a non-homogenous coefficient of friction, comprising a control means for the implementation of an acceleration slip regulation which controls the influencing of a drive wheel on the side with a low coefficient of friction by means of a braking force, is characterized in that it contains a determination unit for determining a value, whereby the value corresponds to the braking force set by the control means, that it contains an estimation unit for estimating a disrupting yaw momentum upon consulting the determined value, and that it contains a control unit for determining a control portion of a supplemental steering angle in dependence on the estimated disrupting yaw momentum.

BRIEF DESCRIPTION OF THE DRAWINGS

Additional advantages, special characteristics, and suitable further developments of the invention proceed from the written description and the subsequent presentation of preferred examples of implementation by means of the figures.

The figures depict the following.

DETAILED DESCRIPTION OF THE PREFERRED EMBODIMENTS

What is assumed here, by way of example, is a two-axle, four-wheeled vehicle with rear drive and a front steering unit which has a hydraulic braking system. The invention can, however, also be used in vehicles with front drive or with four-wheel drive. Furthermore, the steering unit can also be a rear-steering unit, in which the rear wheels of the vehicle are designed to be steerable.

The vehicle comprises a control system for acceleration slip regulation (ASR), which limits the slippage of the wheel upon acceleration by influencing the wheel braking of the drive wheels with a braking pressure at a preset value at which a sufficient traction of the drive wheels is guaranteed. In particular, the vehicle has the sensing technology necessary for that purpose that is already known to the average technician, such as wheel rotational speed and braking pressure sensors, for example, actuators, such as a controllable pressure supply, for example, and a controllable valve on the wheel braking cylinders, as well as one or more control devices for controlling the actuators.

Figure 1A:
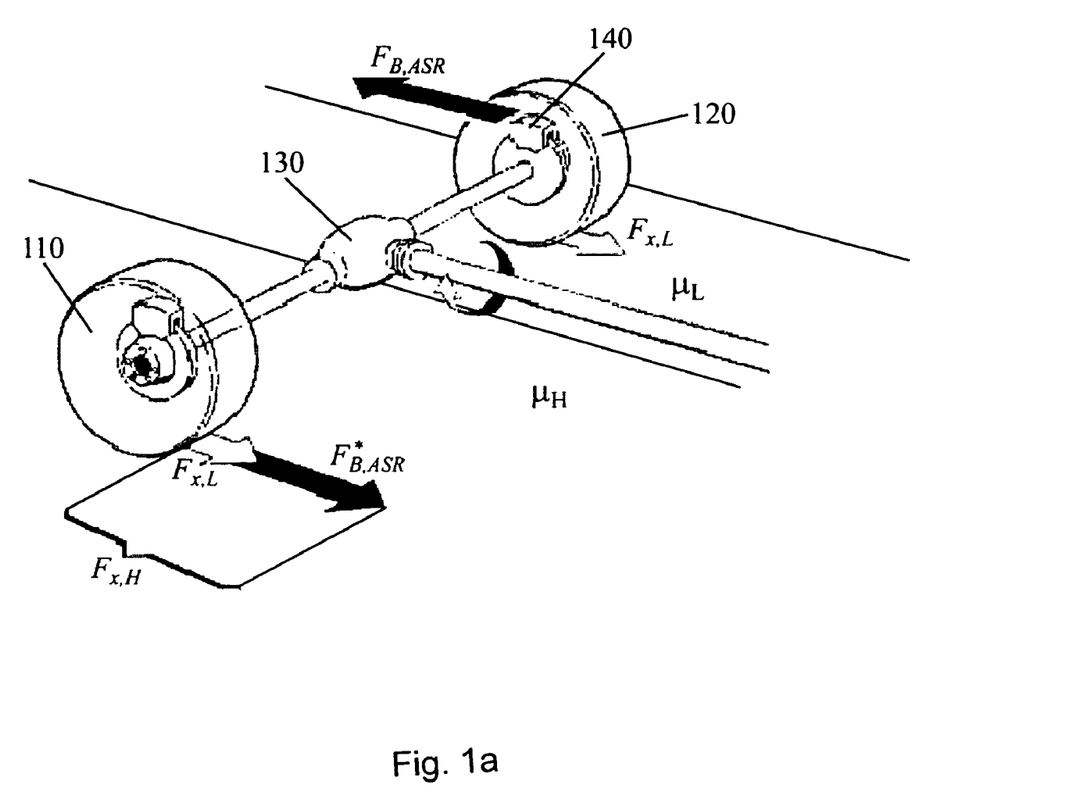
FIG. 1a: A sketch for the representation of the drive forces acting on the drive wheels in an ASR brake engagement in a μ-split situation.

The drive wheels 110, 120 on the rear axis of the vehicle are connected with one another by way of a differential 130, which brings about a splitting of the drive torque on the wheels in the ratio of 1:1. What is understood by drive torque in this connection is the torque acting on the drive wheel which an equal amount of momentum counteracts, which momentum is caused by a longitudinal force acting on the contact surface of the tire. That is to say, it is a supported drive torque.

As is illustrated in FIG. 1a, because of the effect of the differential 130, the drive torque on the drive wheel 110 is limited, on the side with the greater coefficient of friction $\mu_H$, to the value preset on the wheel 120 on the side with the smaller coefficient of friction $\mu_L$, so that both wheels 110, 120 transfer the drive force $F_{x,L}$. A torque additionally provided by the drive motor of the vehicle leads to an excess rotation or spinning of the wheel 120 on the side with the low coefficient of friction, as the case may be.

In order to reduce the slippage of the wheel and to increase the transferable longitudinal and lateral guiding forces on an excessively rotating drive wheel 120 on the side with the low coefficient of friction, the wheel brake 140 of the drive wheel 120 is, in this case, acted on by an ASR engagement with a braking pressure. Upon the engagement, the braking force $F_{B,ASR}$ thereby acts on the wheel, which braking force has the torque:

$$M_{B,ASR} = r_B F_{B,ASR} \quad (1)$$

as its result, whereby $r_B$ signifies the distance between the contact point of the braking force $F_{B,ASR}$ and the rotational axis of the drive wheel 120, which is also termed the effective brake disk radius.

Upon the ASR engagement, the momentum $M_{B,ASR}$ is consequently additionally supported on the drive wheel 120, so that, because of the above-described function of the differential 130, the drive torque on the drive wheel 110 is also increased on the side with a high coefficient of friction by the amount of the momentum $M_{B,ASR}$. In addition to the drive force $F_{x,L}$, the drive force:

$$F^*_{B,ASR} = 1/r_{dyn} \cdot M_{B,ASR} = r_B/r_{dyn} \cdot |F_{B,ASR}| \quad (2)$$

is thus transferred through the drive wheel 110 by disregarding the wheel acceleration.

The drive force transferred by the drive wheel 110 can, however, likewise also be determined by consideration of the wheel acceleration $\dot{\omega}$. In addition, the following results from the torsion balance:

$$J\dot{\omega} = M_{B,ASR} - F^*_{B,ASR} \cdot r_{dyn} \quad (3)$$

of the drive wheel 110 for the additional drive force:

$$F^*_{B,ASR} = 1/r_{dyn} \cdot (M_{B,ASR} - J\dot{\omega}) = 1/r_{dyn} \cdot (r_B \cdot |F_{B,ASR}| - J\dot{\omega}), \quad (4)$$

whereby $r_{dyn}$ is the dynamic tire radius, and J is the momentum of inertia of the wheel.

Consequently, the drive wheel 110 on the side with a high coefficient of friction transfers the drive force:

$$F_{x,H} = F_{x,L} + F^*_{B,ASR}, \quad (5)$$

whereas the drive wheel 120 on the side with a low coefficient of friction only transfers the drive force $F_{x,L}$.

Figure 1B:
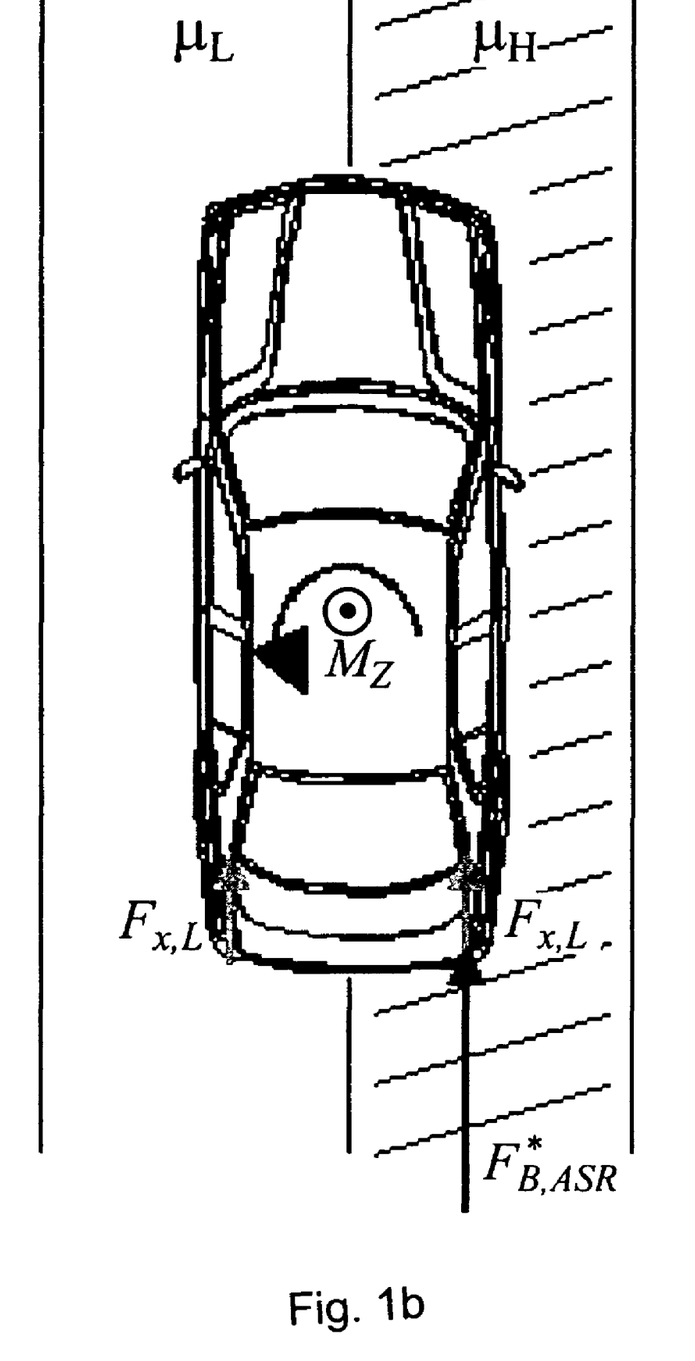
FIG. 1b: A sketch for the representation of the origination of a disrupting yaw momentum in an ASR brake engagement in a μ-split situation.

A disrupting yaw momentum $M_Z$ is brought about by the differing drive forces, which disrupting yaw momentum can, as depicted in FIG. 1b, lead to a turning inward of the vehicle in the direction of the side with a low coefficient of friction if the lateral guiding force that can be transmitted by the tires is not great enough to compensate for the lateral force brought about by the disrupting yaw momentum $M_Z$.

At equal distances s between the wheel contact surfaces of the left and the right drive wheel, as measured in the lateral direction of the vehicle, the disrupting yaw momentum $M_Z$ results in the following form from the difference between the drive force $F_{x,H}$ on the side with a high coefficient of friction and the drive force $F_{x,L}$ on the side with low coefficient of friction, which is provided here by the drive force $F^*_{B,ASR}$, or the amount of which is:

$$M_Z = \pm s(F_{x,H} - F_{x,L}) = \pm s \frac{r_B}{r_{dyn}} |F_{B,ASR}|. \quad (6)$$

The positive (negative) sign is to be selected if the side with a high coefficient of friction is located on the right (left) longitudinal side of the vehicle. In one additional form of implementation of the invention, in which the wheel acceleration is likewise taken into consideration, in equation 6, equation 5 is inserted in connection with equation 4, whereby the sign convention stated above is retained.

In order to stabilize the driving condition, it is provided in this situation in accordance with the invention that a supplemental steering angle $\Delta\delta$ is determined, the control portion $\Delta\delta_Z$ of which is determined in the sense of a disturbance value compensation or advance control, as the case may be. The supplemental steering angle $\Delta\delta$ is thereby computed in such a manner that it brings about a yaw momentum that compensates the disrupting yaw momentum $M_Z$.

Figure 2:
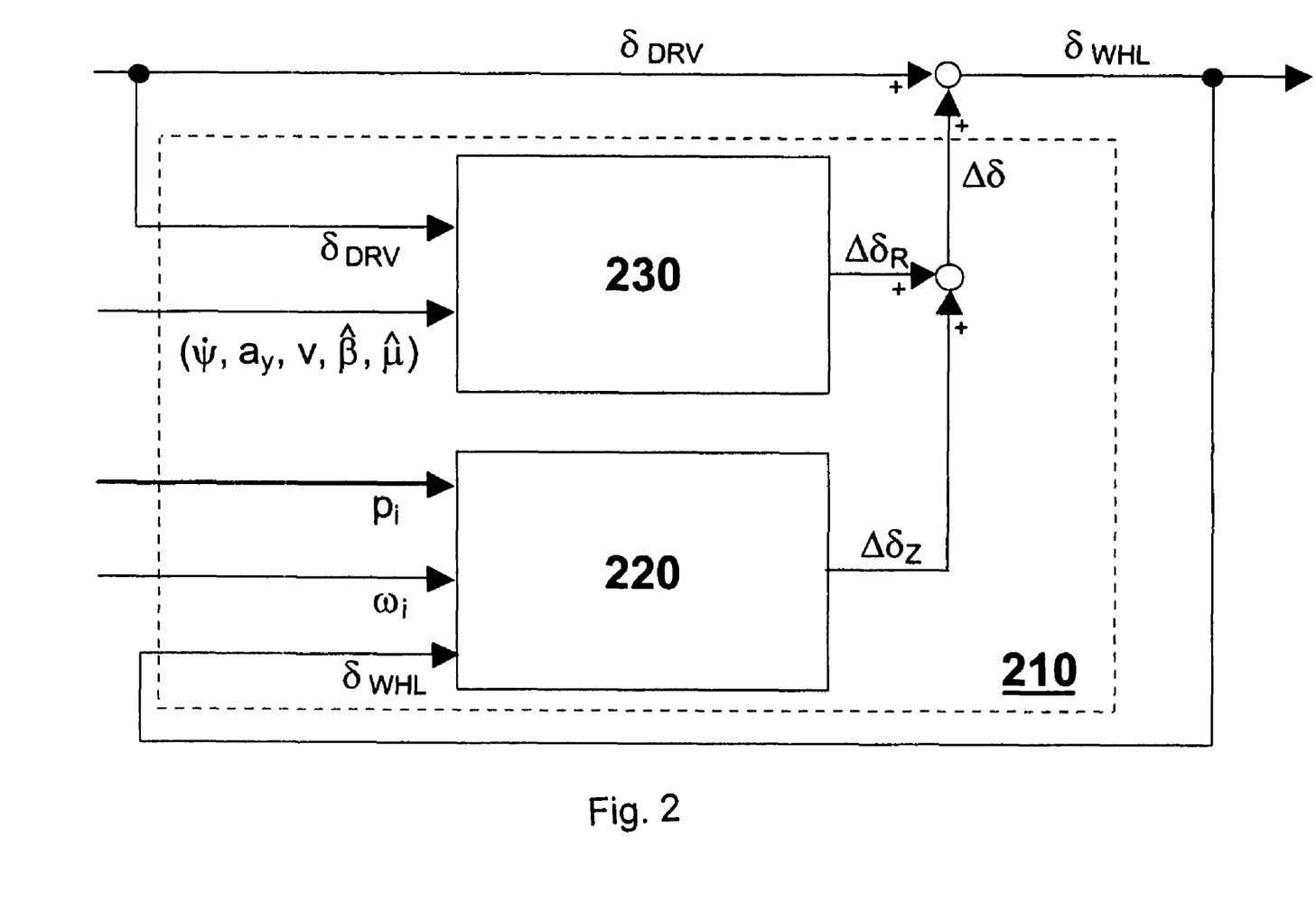
FIG. 2: A schematic block diagram of a steering angle controller.

A regulating apparatus 210 is provided for the determination of the supplemental steering angle $\Delta\delta$, which apparatus comprises a component 220 for the advance control and, preferably, an additional component 230 for the regulation of the driving condition. One preferred form of implementation of the regulating apparatus 210 is depicted in FIG. 2 by means of a schematic block diagram. The apparatus thereby comprises a block 220, in which a control portion $\Delta\delta_Z$ of the supplemental steering angle $\Delta\delta$ is determined, which angle is determined by means of an estimated value $\hat{M}_Z$ of the disrupting yaw momentum $M_Z$. In addition, a driving condition controller 230 is provided, which determines a regulation portion $\Delta\delta_R$ of the supplemental steering angle $\Delta\delta$, in which additional disturbances and, in particular, the vehicle reaction are considered. The supplemental steering angle $\Delta\delta$, which is conveyed as a supplemental steering angle requirement to the actuator system of the steering unit, results as the sum of the control portion $\Delta\delta_Z$ and the regulation portion $\Delta\delta_R$.

The regulating apparatus 210 is preferably activated if an ASR brake engagement takes place on a drive wheel 120, in which the braking pressure $p_{ASR}$ set in the wheel brake 140 exceeds a preset threshold value.

In order to avoid an impairment of a yaw rate control system (ESP), the activation only additionally takes place if no ESP brake engagement has been carried out. This is, however, already generally ensured through the fact that ASR engagements are suppressed if the ESP control is active.

Figure 3:
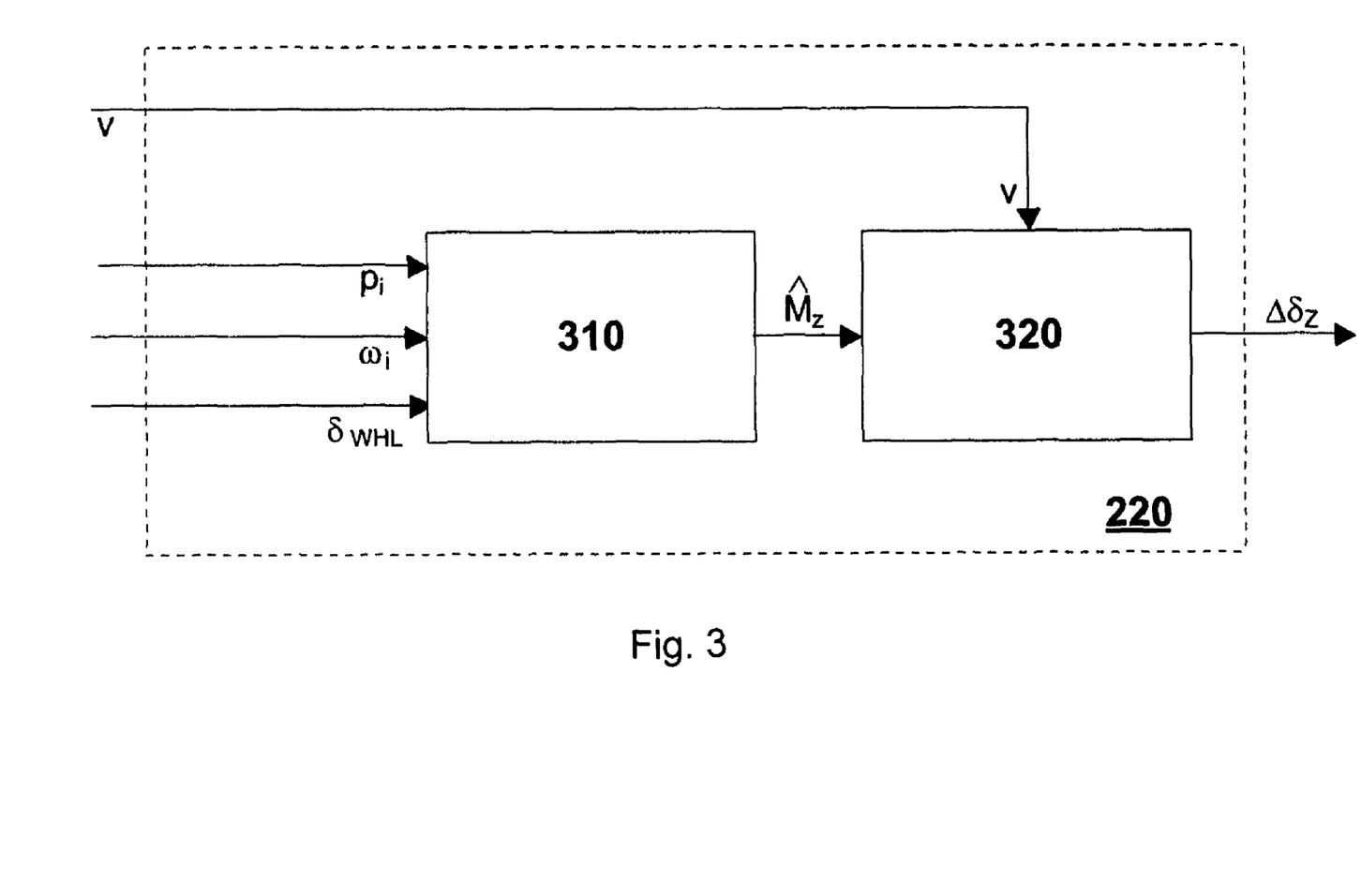
FIG. 3: A schematic block diagram of a block of the steering angle controller depicted in FIG. 2, in which a control portion of the supplemental steering angle is determined.

One preferred form of implementation of the block 220 for the determination of the control portion $\Delta\delta_Z$ of the supplemental steering angle $\Delta\delta$ is depicted in FIG. 3. The braking pressures $p_i$ on the wheel brakes and the reference speed v of the vehicle, as well as, optionally, the steering angle $\delta_{WHL}$ on the steerable wheels of the vehicle and the angular speeds $\omega_i$ of the wheels of the vehicle, serve as input signals of the block 220.

An estimated value $\hat{M}_Z$ of the disrupting yaw momentum $M_Z$ is determined in the block 310. This is preferably carried out by means of equation 3, whereby the braking force $F_{B,ASR}$ can be determined from the braking pressure $p_{ASR}$ that is set in the ASR engagement in the wheel brake 140 of the drive wheel 120 on the side with a low coefficient of friction. The pressure requirements of the ASR control device can thereby be taken as the basis. A measurement of the braking pressure $p_{ASR}$ can likewise be carried out on the side with a low coefficient of friction, however, by means of a pressure sensor on the wheel brake 140 of the drive wheel 120.

A linear connection between the braking pressure $p_{ASR}$ and the braking force $F_{B,ASR}$ is preferably taken as the basis, so that the following is applicable:

$$F_{B,ASR} = K_{pi} \cdot p_{ASR} \quad (i=l,r) \tag{7}$$

The proportionality constants $K_{pi}$ for the wheel brakes on the left drive wheel (i=l) and on the right drive wheel (i=r) result from the brake geometry for $K_{pi} = A \cdot C°$, whereby A signifies the brake piston surface, and $C°$ signifies the effective coefficient of friction between the brake liners and the brake disk. The proportionality constants $K_{pi}$ are thereby, as a general rule, equally large for the wheel brakes of the left and of the right rear wheel.

In accordance with equation 6, the estimated value $\hat{M}_Z$ for the disrupting yaw momentum results in the form:

$$\hat{M}_Z = a_i K_{pi} p_{ASR} \frac{r_B}{r_{dyn}} \quad (i = l, r) \tag{8}$$

The factor $a_l=+1$ is thereby used if the ASR brake engagement takes place on the left drive wheel, that is to say, if the side with a low coefficient of friction is located on the left longitudinal side of the vehicle, and the factor $a_r=-1$ is used if the ASR brake engagement takes place on the right drive wheel, that is to say, if the side with a low coefficient of friction is located on the right side of the vehicle.

If the drive wheels 110, 120 are steerable wheels of the vehicle, then the momentary steering angle $\delta_{WHL}$ on the wheels 110, 120 is to be additionally taken into consideration in the computation of the disrupting yaw momentum, and equations 6 and 8 are to be adjusted correspondingly, since the lever arm of the drive force difference is displaced because of the steering angle.

The control portion $\Delta\delta_Z$ of the supplemental steering angle $\Delta\delta$ is determined from the estimated disrupting yaw momentum $\hat{M}_Z$ in a reverse vehicle model, whereby a linear single-track model preferably forms the basis, and the connection between the disrupting yaw momentum $M_Z$ and the steering angle that exists in this model is linearized (principle of disturbance value compensation).

The control portion $\Delta\delta_Z$ is accordingly determined by a multiplication of the estimated disrupting yaw momentum $\hat{M}_Z$ by the amplification factor $K_M$:

$$\Delta\delta_Z = K_M(v) \cdot \hat{M}_Z \tag{9}$$

It has thereby been shown that this connection depends on the vehicle speed v. As a result, the amplification factor $K_M$ is determined in an adaptive manner in dependence on the vehicle speed v, for example, by means of characteristics that are determined in the driving test, and the following is applicable:

$$\Delta\delta_Z = K_M(v) \cdot \hat{M}_Z \tag{10}$$

Furthermore, the wheel slippage of the braked drive wheel 120 can also be determined in the block 310 by means of the measuring signals $\omega_i$ of the wheel rotational speed sensors in order to carry out an examination of the plausibility of the ASR brake engagement.

Because of the imprecisions that come about upon the estimation of the disrupting yaw momentum $M_Z$, for example, and because of the disturbances that are possibly superimposed, it is not possible to ideally compensate for the disrupting yaw momentum $M_Z$ in every driving situation by means of the supplemental steering angle portion $\Delta\delta_Z$. Above all, the value of the braking force $F_{B,ASR}$ computed in accordance with equation 4 is thereby subject to error, since imprecisions can appear in the determination of the braking pressure $p_{ASR}$ in the wheel brake 140, and the effects of a change of the coefficient of friction of the brake liners, which can come about because of the altered operating conditions, such as an altered operating temperature, for example, or because of the increasing length of operation, cannot be sufficiently taken into consideration.

Thus, a driving condition control in the block 230 is superimposed on the switching of the disturbance value in the block 220, as depicted in FIG. 2. A regulation portion $\Delta\delta_R$ of the supplemental steering angle $\Delta\delta$ is determined in the block 230 in dependence on the driving condition values, such as the yaw rate $\dot{\psi}$ of the vehicle, for example, and, optionally, also in dependence on the lateral acceleration $a_y$, or the sideslip angle $\beta$ of the vehicle. One preferred form of implementation of the block 230 is thereby depicted in FIG. 4 as a schematic block diagram.

Figure 4:
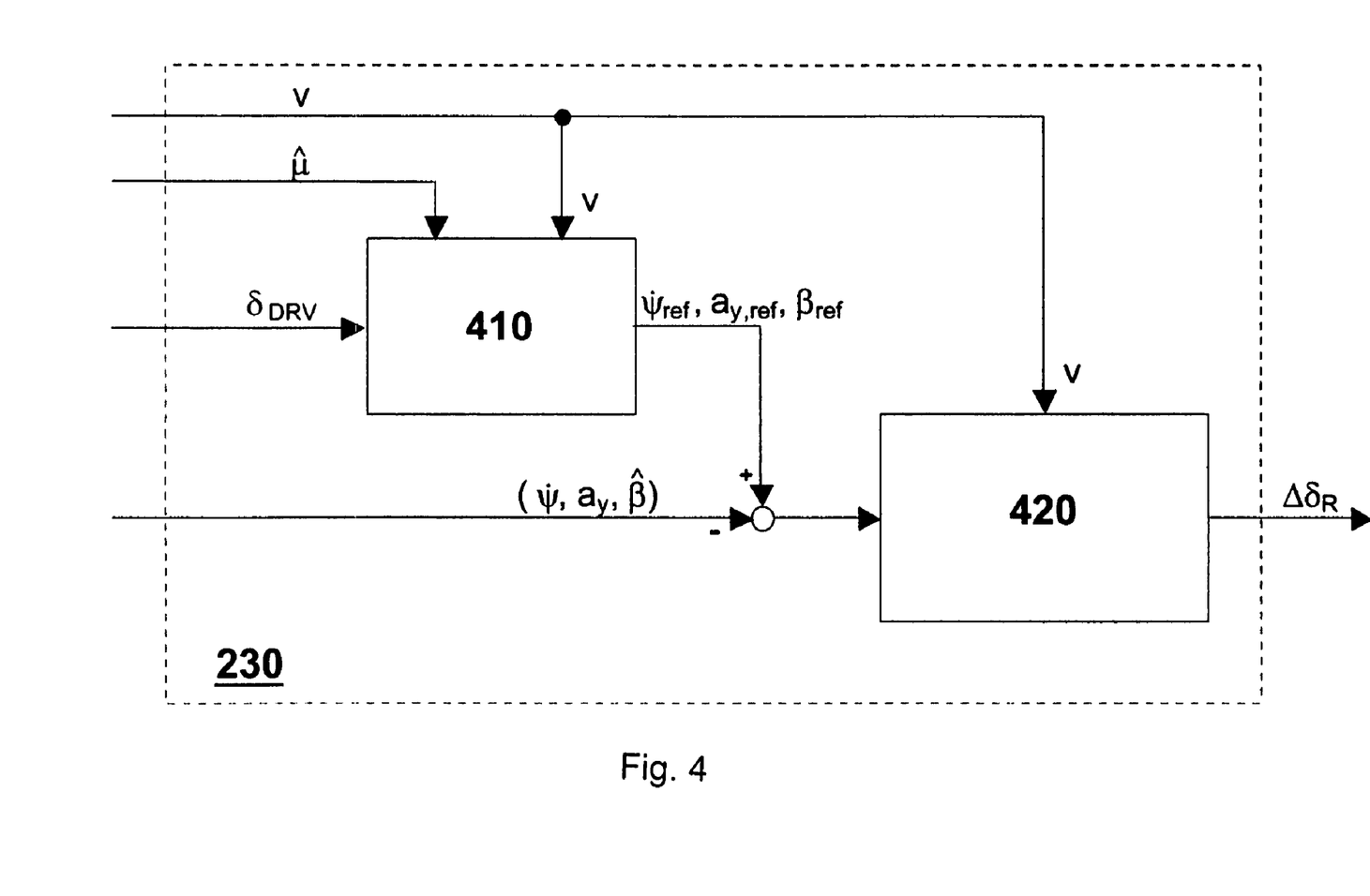
FIG. 4: A schematic block diagram of a block of the steering angle controller depicted in FIG. 2, in which a regulation portion of the supplemental steering angle is determined.

The regulation portion $\Delta\delta_R$ is based, in particular, on the yaw behavior of the vehicle. For the evaluation of the yaw behavior, a reference yaw rate $\dot{\psi}_{ref}$ is determined in the block 410 in a vehicle model by means of the steering angle $\delta_{DRV}$ commanded by the driver and by means of the vehicle reference speed v. This is carried out through the use of a reference model of the vehicle, whereby a stationary, linear single-track model, for example, is taken as the basis. In one advantageous configuration, a vehicle model is thereby selected that takes into consideration an estimated value $\hat{\mu}$ for the roadway coefficient of friction $\mu$, which can be determined by means of the measured lateral acceleration $a_y$, for example. The remaining coefficient of friction potential thereby also enters into the reference yaw rate $\dot{\psi}_{ref}$. The vehicle model for the determination of the reference yaw rate $\dot{\psi}_{ref}$ that is described in the German disclosure document DE 195 15 059 A1 is thereby preferably used. For the determination of the supplemental steering angle portion $\Delta\delta_R$, an adaptive driving condition controller 420 is used which is, preferably, configured as a proportional integral differential controller (PID controller). The supplemental steering angle portion $\Delta\delta_R$ thereby results as the sum of a P-portion $\Delta\delta_{R,P}$, an I-portion $\Delta\delta_{R,I}$, and a D-portion $\Delta\delta_{R,D}$:

$$\Delta\delta_R = \Delta\delta_{R,P} + \Delta\delta_{R,I} + \Delta\delta_{R,D}. \tag{11}$$

The control value for the P-portion $\Delta\delta_{R,P}$ is the yaw rate deviation $\Delta\dot{\psi}$. The following control law is applicable for the supplemental steering angle portion resulting from the P-portion:

$$\Delta\delta_{R,P} = K_{FB,P}(v) \cdot \Delta\dot{\psi}. \tag{12}$$

The deviation of the yaw rates $\Delta\dot{\psi}$ is thereby defined as the difference between the measured yaw rate $\dot{\psi}$ of the vehicle and the reference yaw rate $\dot{\psi}_{ref}$:

$$\Delta\dot{\psi} = \dot{\psi} - \dot{\psi}_{ref} \tag{13}$$

The yaw rate of the vehicle $\dot{\psi}$ is measured directly with a yaw rate sensor, which is preferably integrated, along with a lateral acceleration sensor, into a sensor cluster, in which both the yaw rate $\dot{\psi}$ as well as the lateral acceleration $\alpha_y$ of the vehicle are measured. Redundant sensor elements can also thereby be used in the cluster, as the result of which an improved signal monitoring and determination of the plausibility of the signal is possible.

The amplification factor $K_{FB,P}(v)$ for the controller feedback of the deviation of the yaw rates $\Delta\dot{\psi}$ is adapted through the current vehicle speed v. Since the vehicle speed v significantly influences the driving behavior of the vehicle, this is taken into consideration in the controller amplification and, as the result, in the control circuit of the vehicle closed by the controller as well.

The control value for the I-portion $\Delta\delta_{R,I}$ of the supplemental steering angle portion $\Delta\delta_R$ is a yaw angle deviation $\Delta\psi$. The following control law is applicable for the supplemental steering angle portion that results from the I-portion:

$$\Delta\delta_{R,I} = K_{FB,I}(v) \cdot \Delta\psi. \quad (14)$$

The yaw angle deviation $\Delta\psi$ is determined by integration of the deviation of the yaw rates $\Delta\dot{\psi}$:

$$\Delta\psi = \int \Delta\dot{\psi}\, dt = \int (\dot{\psi} - \dot{\psi}_{ref})\, dt \quad (15)$$

The yaw angle deviation $\Delta\psi$ is consequently based on the same signal sources as the deviation of the yaw rates $\Delta\dot{\psi}$, and is determined from these by means of an integrator element. A measurement of the yaw angle $\psi$ can, however, likewise be provided by means of a gyroscope casing.

The amplification factor $K_{FB,I}(v)$ for the controller feedback of the yaw angle deviation $\Delta\psi$ is adapted by means of the vehicle speed v. Since the vehicle speed v significantly influences the driving behavior of the vehicle, this is taken into consideration in the controller amplification and, as the result, also in the control circuit of the vehicle closed by means of the controller as well.

The control value for the D-portion $\Delta\delta_{R,D}$ of the supplemental steering angle portion $\Delta\delta_R$ is a yaw acceleration deviation $\Delta\ddot{\psi}$. The following control law is applicable to the supplemental steering angle portion resulting from the D-portion:

$$\Delta\delta_{R,D} = K_{FB,D}(v) \cdot \Delta\ddot{\psi}. \quad (16)$$

The yaw acceleration deviation $\Delta\ddot{\psi}$ is determined through the differentiation of the deviation of the yaw rates $\Delta\dot{\psi}$:

$$\Delta\ddot{\psi} = \frac{d}{dt}\Delta\dot{\psi} = \frac{d}{dt}(\dot{\psi} - \dot{\psi}_{ref}) \quad (17)$$

The yaw acceleration deviation $\Delta\ddot{\psi}$ is consequently based on the same signal sources as the deviation of the yaw rates $\Delta\dot{\psi}$, and is determined from this by means of a differential element. A measurement of the yaw acceleration $\ddot{\psi}$ can likewise be provided by means of a yaw acceleration sensor, however.

The amplification factor $K_{FB,D}(v)$ for the controller feedback of the yaw acceleration deviation $\Delta\ddot{\psi}$ is adapted by means of the vehicle speed v. Since the vehicle speed v significantly influences the driving behavior of the vehicle, this is taken into consideration in the controller amplification and, as the result, in the control circuit of the vehicle that is closed by means of the controller as well.

A control analogous to the yaw rates depicted can likewise be additionally carried out for the lateral acceleration $\alpha_y$ and/or the side-slip angle $\beta$ of the vehicle estimated from several driving condition values. The control values are thereby a deviation $\Delta\alpha_y$ between the lateral acceleration $\alpha_y$ of the vehicle and a reference lateral acceleration $\alpha_{y,ref}$ or a deviation $\Delta\beta$ between the estimated side-slip angle $\beta$ of the vehicle and a reference side-slip angle $\beta_{ref}$ as the case may be, whereby the reference lateral acceleration $\alpha_{y,ref}$ as well as the reference side-slip angle $\beta_{ref}$ for example, can be preset by corresponding threshold values, and which is likewise determined in a computed vehicle reference model.

In one additional consideration of the lateral acceleration $\alpha_y$ and/or of the side-slip angles $\beta$, corresponding portions of the supplemental steering angle portion $\Delta\delta_R$ are preferably determined in the controller 420 by the P-controller or by the PID controller, and are subsequently subjected to an arbitration, through which the regulation portion $\Delta\delta_R$ is then determined.

The control portion $\Delta\delta_Z$ and the regulation portion $\Delta\delta_R$ are added together in an adding unit, and the supplemental steering angle placement requirement $\Delta\delta$ that results as the sum of the two portions is conveyed to a control unit of the actuator placed on the steering line, and is adjusted by the actuator.

The actuator may be a superimposition steering unit, for example, in which a planetary gear or a harmonic drive gear is provided in the steering column system of the vehicle, which makes it possible to superimpose the steering movement commanded by the vehicle driver and an additional steering movement, which is preferably carried out in accordance with the supplemental steering angle placement requirement $\Delta\delta$.

The actuator can, furthermore, be a steer-by-wire steering unit, in which there is no mechanical connection between the steering wheel activated by the vehicle driver and the steerable wheels of the vehicle.

The steering angle $\delta_{WHL}$ on the steerable wheels of the vehicle results as the sum of the steering angle $\delta_{DRV}$ commanded by the driver and the supplemental steering angle $\Delta\delta$:

$$\delta_{WHL} = \delta_{DRV} + \Delta\delta \quad (18)$$

Differing signs result for the individual steering angle portions $\Delta\delta_Z$ and $\Delta\delta_R$, depending on whether the active steering unit is on the front axis or the rear axis of the vehicle.

Furthermore, it can be provided, in additional forms of implementation of the invention, to not set the supplemental steering angle $\Delta\delta$ directly on the steerable wheels of the vehicle, but to instead determine a supplemental steering momentum that is imparted to the steering column system of the vehicle in dependence on the supplemental steering angle $\Delta\delta$ and, in particular, on the steering wheel activated by the vehicle driver. The determination of the supplemental steering momentum is thereby carried out in an additional regulating unit of the regulating apparatus, such as through the multiplication of the supplemental steering angle by an amplification factor by a steering momentum regulator, for example, which presets such a supplemental steering momentum for the driver, so that the driver can adjust the target steering angle both rapidly and precisely.

The vehicle driver is thereby supported by means of the supplemental steering momentum in setting a theoretical steering angle, which is provided as the sum of the steering angle $\delta_{DRV}$ currently commanded by the vehicle driver and of the supplemental steering angle $\Delta\delta$. The supplemental steering momentum can thereby be directed into the steering column system by means of an electrical or hydraulic servo-control unit, or also by means of a steer-by-wire steering unit.

The determination of the supplemental steering angle $\Delta\delta$ required for the stabilization and the adjustment of the supplemental steering angle $\Delta\delta$ or of the supplemental steering momentum determined from this, as the case may be, are carried out in an ASR engagement in a μ-split situation, and thereby much more rapidly than the average driver can recognize the corresponding situation and react to the same by means of counter-steering.

As a result, the vehicle can consequently be controlled more easily by the vehicle driver upon acceleration, in μ-split situations and, in particular, upon starting up in μ-split situations, because of the invention. The stability of the vehicle is effectively increased in these situations, and the vehicle is, in particular, prevented from laterally veering or going astray during acceleration on a roadway with a non-homogenous coefficient of friction. Furthermore, the lateral force potential that is available to the wheels of the vehicle is increased, since the lateral forces that act on the wheels because of the disrupting yaw momentum $M_Z$ are broken down by the supplemental steering angle $\Delta\delta$.

The invention claimed is:

1. Method for increasing the stability of a vehicle upon acceleration on a roadway with a non-homogenous coefficient of friction, whereby a drive wheel is acted on with a braking force on a side with a low coefficient of friction by means of acceleration slip regulation, comprising:
   determining a value which corresponds to the braking force set by the means of acceleration slip regulation;
   determining a disrupting yaw momentum from the determined value; and
   determining a control portion of a supplemental steering angle based on the disrupting yaw momentum,
   wherein the control portion of the supplemental steering angle is computed by means of a control law with the form:

$$\Delta\delta_Z = K_M(v)\cdot \hat{M}_Z,$$

whereby $\Delta\delta_Z$ signifies the control portion of the supplemental steering angle, $K_M$ signifies an amplification factor, v signifies a reference speed of the vehicle, and $\hat{M}_Z$ signifies an estimated value for the disrupting yaw momentum.

2. Method in accordance with claim 1, wherein the determined value is a braking pressure which is set by acceleration slip regulation in a wheel brake of the drive wheel on the side with a low coefficient of friction.

3. Method in accordance with claim 1, wherein the supplemental steering angle is set on at least one steerable wheel of the vehicle.

4. Method in accordance with claim 1, wherein a supplemental steering momentum is determined in dependence on the supplemental steering angle, and a steering line of the vehicle is acted on by the supplemental steering momentum.

5. Method in accordance with claim 1, wherein a regulation portion of the supplemental steering angle is determined in dependence on a standard deviation between a control value and a reference value measured by means of vehicle sensors or computed from measuring signals of vehicle sensors, and the supplemental steering angle corresponds to a sum of the regulation portion and the control portion.

6. Method in accordance with claim 5, wherein the regulation portion of the supplemental steering angle is determined in dependence on a deviation of the yaw rates between the yaw rate of the vehicle and a reference yaw rate of the vehicle, whereby the reference yaw rate is determined by means of at least one preset value preset by a vehicle driver in a vehicle model.

7. Method in accordance with claim 5, wherein the regulation portion of the supplemental steering angle is determined in dependence on a lateral acceleration deviation between a measured lateral acceleration of the vehicle and a reference lateral acceleration, whereby the reference lateral acceleration is preset by a threshold value.

8. Method in accordance with claim 1, wherein the supplemental steering angle is set on a steerable wheel by means of a steer-by-wire steering unit.

9. Method in accordance with claim 1, wherein the supplemental steering angle is set on a steerable wheel set by means of a superimposition steering.

10. Method in accordance with claim 1, wherein in addition to a steering movement commanded by a vehicle driver, an additional steering movement is carried out in accordance with the supplemental steering angle.

11. Method in accordance with claim 1, wherein a supplemental steering momentum is set by means of an electrical or hydraulic servo-steering unit.

12. Method in accordance with claim 1, wherein a supplemental steering momentum is set by means of a steer-by-wire steering unit.

13. Method for increasing the stability of a vehicle upon acceleration on a roadway with a non-homogenous coefficient of friction, whereby a drive wheel is acted on with a braking force on a side with a low coefficient of friction by means of acceleration slip regulation, comprising:
   determining a value which corresponds to the braking force set by the means of acceleration slip regulation;
   determining a disrupting yaw momentum from the determined value; and
   determining a control portion of a supplemental steering angle based on the disrupting yaw momentum,
   wherein a regulation portion of the supplemental steering angle is determined in dependence on a standard deviation between a control value and a reference value measured by means of vehicle sensors or computed from measuring signals of vehicle sensors, and the supplemental steering angle corresponds to a sum of the regulation portion and the control portion,
   wherein the regulation portion of the supplemental steering angle is determined by means of a control law with the form:

$$\Delta\delta_R = K_{FB,P}(v)\cdot\Delta\dot{\psi} + K_{FB,I}(v)\cdot\Delta\psi + K_{FB,D}(v)\cdot\Delta\ddot{\psi}$$

whereby, $\Delta\delta_R$ signifies the regulation portion of the supplemental steering angle, $K_{FB,P}$, $K^{FB,I}$ and $K_{FB,D}$ each signify an amplification factor, v signifies the reference speed of the vehicle, $\Delta\dot{\psi}$ signifies the deviation of the yaw rates, $\Delta\psi$ signifies a yaw angle deviation, and $\Delta\ddot{\psi}$ signifies a yaw acceleration deviation.

14. Method for increasing the stability of a vehicle upon acceleration on a roadway with a non-homogenous coefficient of friction, whereby a drive wheel is acted on with a braking force on a side with a low coefficient of friction by means of acceleration slip regulation, comprising:
   determining a value which corresponds to the braking force set by the means of acceleration slip regulation;
   determining a disrupting yaw momentum from the determined value; and
   determining a control portion of a supplemental steering angle based on the disrupting yaw momentum,
   wherein a regulation portion of the supplemental steering angle is determined in dependence on a standard deviation between a control value and a reference value measured by means of vehicle sensors or computed from measuring signals of vehicle sensors, and the supplemental steering angle corresponds to a sum of the regulation portion and the control portion, wherein the regulation portion of the supplemental steering angle is determined in dependence on a side-slip angle deviation between an estimated side-slip angle of the vehicle and a reference side-slip angle, whereby the reference side-slip angle is preset by a threshold value.

15. An apparatus for increasing the stability of a vehicle in an acceleration on a roadway with a non-homogenous coefficient of friction, comprising:
- a control means for the implementation of a drive slip regulation, which controls the influencing of a drive wheel on a side with a low coefficient of friction by a braking force;
- a determination unit for determining a value which corresponds to the braking force set by the control means; and
- an estimation unit for estimating a disrupting yaw momentum with consultation of the determined value;

whereby a control unit determines a control portion of a supplemental steering angle in dependence on the estimated disrupting yaw momentum, wherein a regulation portion of the supplemental steering angle is determined in dependence on a standard deviation between a control value and a reference value measured by means of vehicle sensors or computed from measuring signals of vehicle sensors, and the supplemental steering angle corresponds to a sum of the regulation portion and the control portion, wherein the regulation portion of the supplemental steering angle is determined in dependence on a lateral acceleration deviation between a measured lateral acceleration of the vehicle and a reference lateral acceleration, whereby the reference lateral acceleration is preset by a threshold value.

* * * * *